(12) United States Patent
Liefferink

(10) Patent No.: US 10,986,251 B2
(45) Date of Patent: Apr. 20, 2021

(54) COLOUR STANDARD FROM A DIGITAL INPUT FILE

(71) Applicant: Hauke Maritz Liefferink, Gauteng (ZA)

(72) Inventor: Hauke Maritz Liefferink, Gauteng (ZA)

(*) Notice: Subject to any disclaimer, the term of this patent is extended or adjusted under 35 U.S.C. 154(b) by 0 days.

(21) Appl. No.: 16/878,823

(22) Filed: May 20, 2020

(65) Prior Publication Data

US 2020/0374419 A1  Nov. 26, 2020

(30) Foreign Application Priority Data

May 20, 2019  (ZA) .................................. 2019/03135

(51) Int. Cl.
*H04N 1/60* (2006.01)
(52) U.S. Cl.
CPC ......... *H04N 1/6008* (2013.01); *H04N 1/6005* (2013.01); *H04N 1/6075* (2013.01)
(58) Field of Classification Search
CPC ... H04N 1/6016; H04N 1/6033; H04N 1/6027
See application file for complete search history.

(56) References Cited

U.S. PATENT DOCUMENTS

| | | | | |
|---|---|---|---|---|
| 5,760,913 A * | 6/1998 | Falk | ...................... | H04N 1/6033 358/504 |
| 7,643,036 B1 * | 1/2010 | Rees | ...................... | H04N 1/6058 345/594 |
| 7,724,392 B2 * | 5/2010 | Kuhn | ...................... | H04N 1/603 358/1.9 |
| 7,742,204 B2 * | 6/2010 | Kuhn | ................... | H04N 1/6033 358/504 |
| 2003/0156299 A1 * | 8/2003 | Martinez | .............. | G06K 15/025 358/1.9 |
| 2005/0134852 A1 * | 6/2005 | Cumming | .......... | H04N 1/00068 356/402 |
| 2007/0024657 A1 * | 2/2007 | Zhang | ................... | H04N 1/6033 347/19 |
| 2008/0144054 A1 * | 6/2008 | Van de Capelle | ... | H04N 1/6033 358/1.9 |
| 2008/0158626 A1 * | 7/2008 | Bang | ..................... | H04N 1/6033 358/518 |
| 2008/0225309 A1 * | 9/2008 | Hosier | ................. | H04N 1/6033 358/1.9 |

(Continued)

*Primary Examiner* — Ted W Barnes
(74) *Attorney, Agent, or Firm* — Nixon & Vanderhye P.C.

(57) ABSTRACT

The invention provides a colour standard, assembled from a graphic digital input file, in which one or a combination of CMYK, RGB, Lab or spot colour builds are contained. The colour standard comprises a colour target calibration strip which is indicative of the calibration status of a printing press; an output image which is indicative of the digital input file; and a grid chart of spot colour builds, built-in process inks, with their respective process build values available for each spot colour in the digital input file. The colour standard is configured to capture the calibrated state of the press for a particular digital input file in order to achieve a particular colour-managed output image, so that product print runs of the output image can be repeated accurately and consistently over time.

9 Claims, 6 Drawing Sheets

(6 of 6 Drawing Sheet(s) Filed in Color)

(56) References Cited

U.S. PATENT DOCUMENTS

| | | | | |
|---|---|---|---|---|
| 2009/0296118 A1* | 12/2009 | Tsukamoto | .......... | H04N 1/6033 |
| | | | | 358/1.9 |
| 2011/0069333 A1* | 3/2011 | Katayama | ............ | H04N 1/6055 |
| | | | | 358/1.9 |
| 2012/0250044 A1* | 10/2012 | Teraue | ................. | H04N 1/6033 |
| | | | | 358/1.9 |
| 2012/0263379 A1* | 10/2012 | Bhatti | .................. | H04N 1/6033 |
| | | | | 382/167 |
| 2013/0330092 A1* | 12/2013 | Amit | ................... | H04N 1/6036 |
| | | | | 399/15 |
| 2017/0374237 A1* | 12/2017 | Muller | ...................... | G01J 3/52 |
| 2018/0149521 A1* | 5/2018 | Fujino | ..................... | G01J 3/462 |
| 2019/0122395 A1* | 4/2019 | Fukasawa | ................ | H04N 1/46 |
| 2019/0301941 A1* | 10/2019 | Kawabata | ................ | H04N 1/46 |

* cited by examiner

FIGURE 1 (to be viewed in colour)

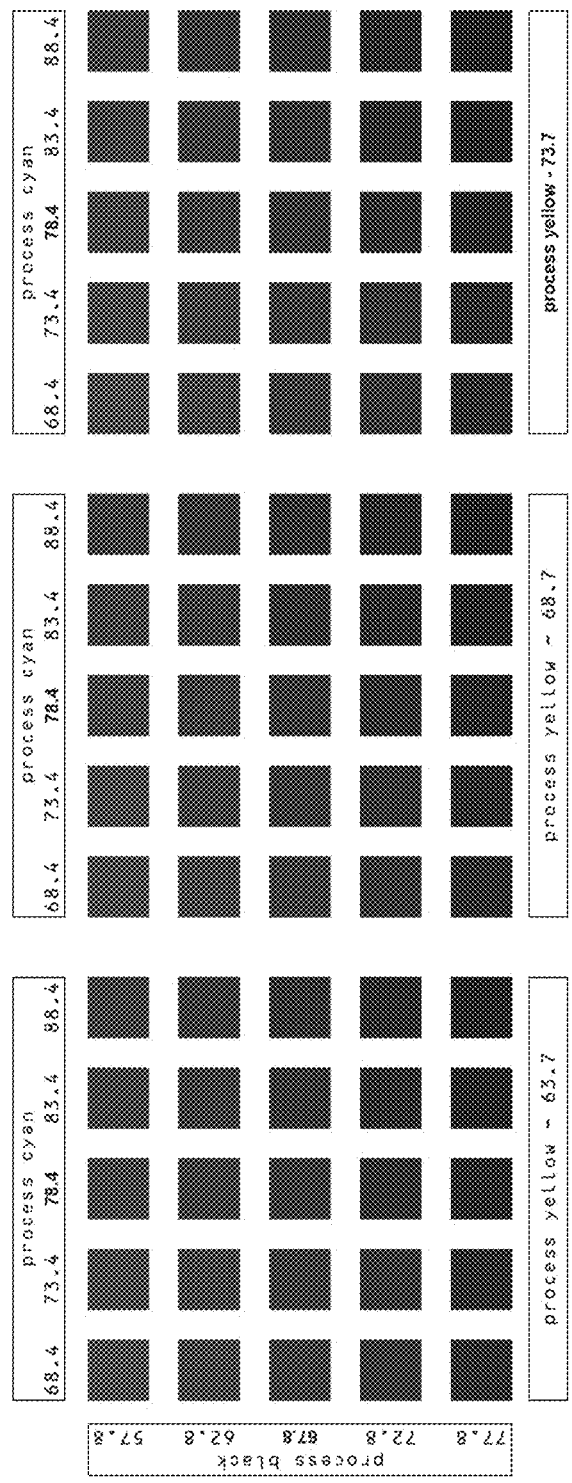
FIGURE 2 (to be viewed in colour) - PRIOR ART

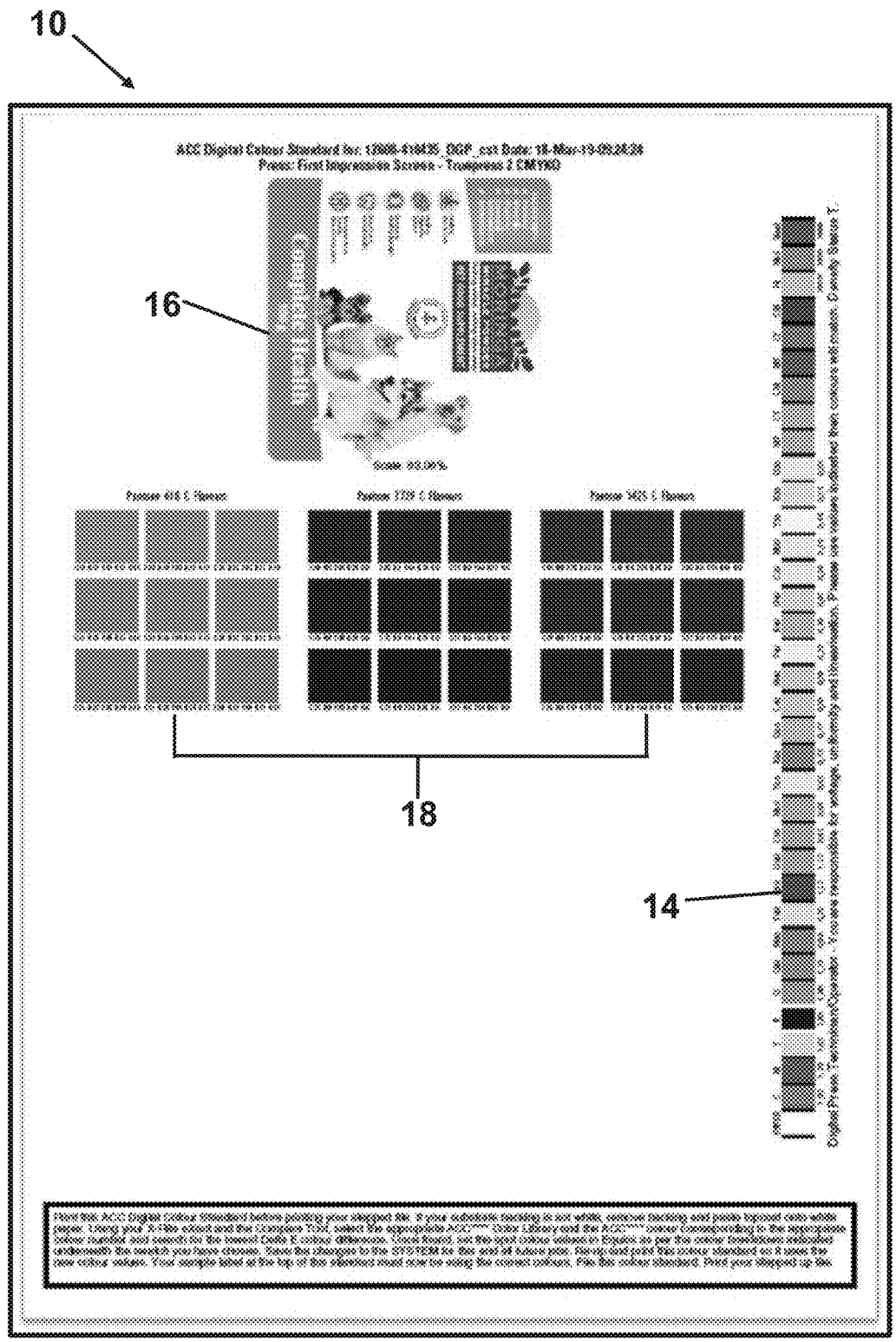
FIGURE 3 (to be viewed in colour)

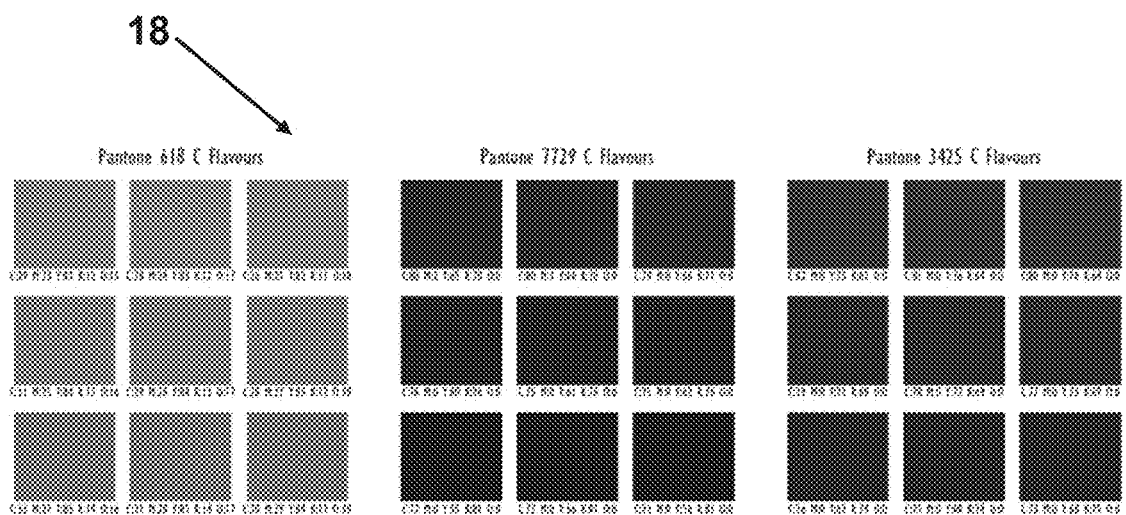
FIGURE 4 (to be viewed in colour)
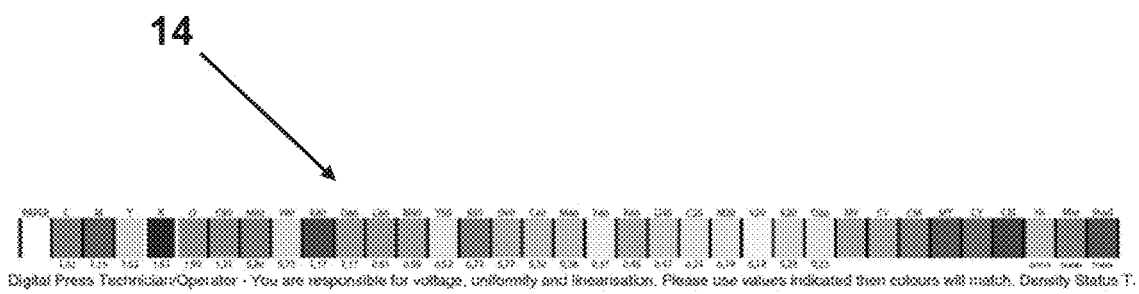
FIGURE 5 (to be viewed in colour)

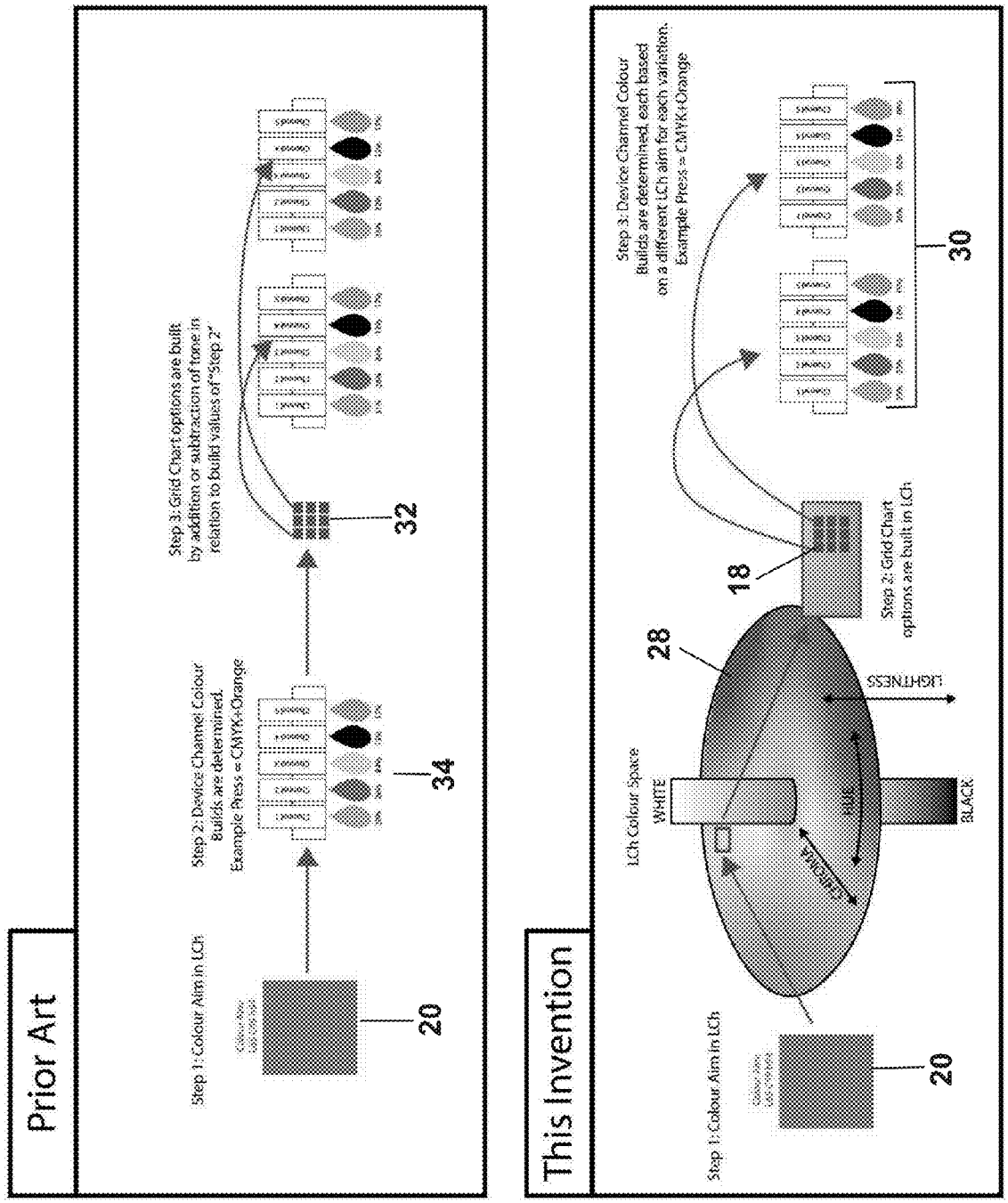
FIGURE 6 (to be viewed in colour)

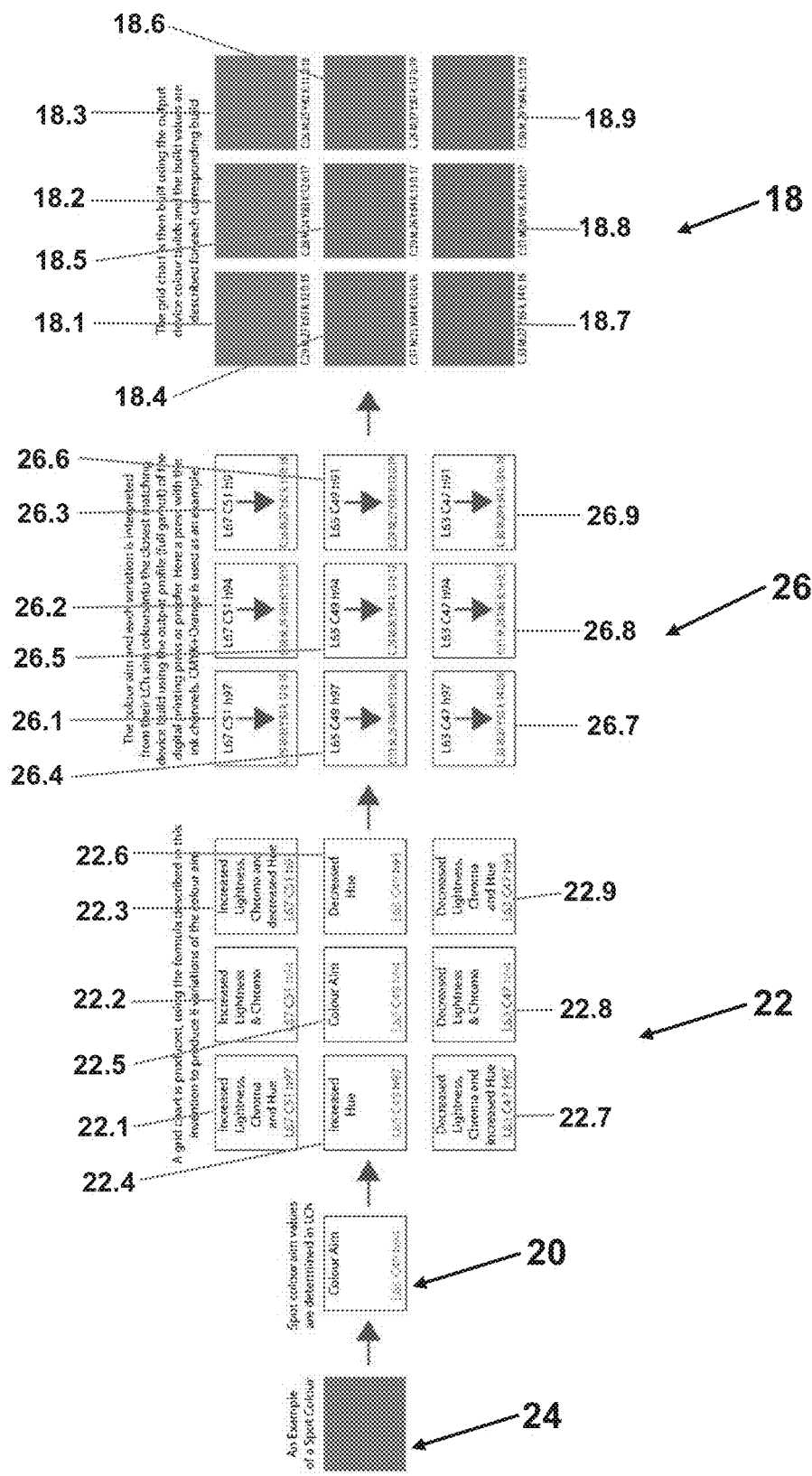
FIGURE 7 (to be viewed in colour)

COLOUR STANDARD FROM A DIGITAL INPUT FILE

This application claims priority to ZA Patent Application No. 2019/03135 filed May 20, 2019, the entire contents of each of which are hereby incorporated by reference.

INTRODUCTION

The invention provides a colour standard, assembled from a graphic input file, such as a PDF document, in which one or a combination of CMYK, RGB, Lab or spot colour builds are contained. The invention further aims to capture and enable verification of the calibration state of a digital printing press or proofer, and to provide an efficient method of selecting an acceptable spot colour build for each spot colour contained in the graphic file.

BACKGROUND TO THE INVENTION

At the outset it is critical to understand that colour and visual verification of colour accuracy are essential features of the present invention. It is therefore of paramount importance that the specification and accompanying colour figures are interpreted against this background.

In the printing industry, colour printing is the reproduction of an image or text in colour. The human eye is particularly responsive to Red, Green and Blue light in additive colour models (RGB as an example) and Cyan, Magenta and Yellow (the opposite colours to RGB) in subtractive colour models (CMYK as an example). While there are many techniques for reproducing images in colour, specific graphic processes and industrial equipment are used for mass reproduction of colour images on a substrate. In this sense, colour printing involves reproduction techniques suited for printing presses capable of thousands or millions of impressions for publishing newspapers and magazines, brochures, cards, posters and mass-market items where printing is done directly onto a packaging substrate. In this type of industrial or commercial printing, four inks are commonly used, namely Cyan, Magenta, Yellow and Key (Black), abbreviated as "CMYK". These inks are transparent and where two or more such inks overlap on a substrate due to sequential printing impressions, additional colours are perceived. Tonal variation, where different percentages of each ink can be defined, further adds to the perceived colour gamut. Printing in CMYK is commonly referred to as printing with process inks (i.e. four colour process). This is thus a fixed number of inks interacting with each other and utilising tone variation to produce a colour gamut of perceived colours. This colour gamut can be enlarged by adding additional inks (extended colour gamut), such as orange and/or green and/or violet and/or red and/or blue. Both four colour process and extended colour gamut printing are referred to in this document as "process printing". The inks used in process printing are referred to as "process inks". A process ink may also be referred to as an ink "channel".

Colour printing can also involve as few as one colour ink, or multiple colour inks which are not process inks. Using a limited number of colour inks, or specific colour inks in addition to the process inks, is referred to as "spot-colour" printing. Generally, spot-colour inks are specific formulations that are designed to print on their own, often alongside process inks, rather than to blend with other inks on the substrate to produce various additional hues and shades. The range of available spot colour inks, much like paint, is nearly unlimited, and much more varied than the colours that can be produced by CMYK four-colour-process printing. Extended colour gamut process printing may produce a simulation of a spot colour more accurately than four colour process, and extended colour gamut process printing is thus better suited on printing presses that are not able to print with spot colours. Spot-colour inks range from subtle pastels to intense fluorescents to reflective metallics.

In conventional printing techniques, brand colours and chromatic colours in packaging applications are typically printed in a spot colour, since printing in process inks alone is inadequate—process printing has a smaller colour gamut, which cannot reproduce all spot colours accurately. Furthermore, individual objects or elements in logo's or graphic elements cannot individually be adjusted easily if composed in process inks only, without affecting other graphic elements, although it can be so adjusted in spot colour inks.

Digital printing refers to methods of printing from a digital-based image (typically a PDF file) directly onto a variety of media. The most popular methods include inkjet or laser printers that deposit ink or toner onto a wide variety of substrates including paper, photo paper, canvas, glass, metal, marble and other substances. In conventional printing, where a printing plate is used, spot colour inks are commonly used in the press, whereas in digital printing spot colour inks are very rarely used and need to be simulated using the process inks available on the press.

A digital printing press or proofer has a colour gamut (a volume of colour, plotted in 3D space) that it can achieve. By calibrating and colour profiling such a press or proofer, its achievable colour gamut is specified and allows that device to match other devices, colour standards or colour builds. Thus, digital printing presses or proofers are most frequently "colour managed", in that they are calibrated (generally via ink limits, linearization and aims) in conjunction with a software Colour Management Module (CMM), which enables devices to simulate each other by adjusting numerical values of colour builds so that the perceived colour they produce remains consistent. Calibration is most frequently done at a specific point in time (for example once a day/week/month/year), measured manually or automatically. However, a calibration state or target strip is generally not present on volume production prints where a CMM has been enabled, since the calibration strip must not be colour managed (apart from ink limits, linearization and such aims) in order to reflect the calibration status of the press correctly.

Furthermore, in the printing industry, graphic artwork depicting a packaging product or commercial print product most often contains both full colour process images (CMYK) and/or spot colours. When such artwork is printed on a digital press, the operator generally prints one or a limited number of copies on the digital press and evaluates the colour in relation to aims that have been provided by an instructor/client. Such aims may be spot colour swatches or books, physical samples, Lab or spectral colour aims and/or industry standards, or contract proofs describing or depicting spot and/or CMYK process aims or colours. In the event that the evaluation is deemed acceptable (i.e. the printed colour correlates to the aim provided), the production run may continue. In the event that the evaluation is not deemed acceptable, press operators may resort to manual adjustment of the build values of spot and process colours and running of additional adjusted prints until an acceptable print is produced.

Another option sometimes available to digital press operators is the ability of software interacting with digital presses to produce a so-called "grid chart" of a spot colour, which is effectively a collection of colour options, using a model that increases or decreases the percentage (tone) of each colour channel in relation to each other in order to attempt to provide additional options that may result in a closer visual or instrument match to a target aim. Current grid chart solutions do not derive their intended colour build values from colour models such as CIELAB (Lab) or CIELCH (LCh), but instead resort purely to a method of addition or subtraction, relating to tone percentages in determining colour build options that illustrate options available for selection, other than the original colour build. For this reason current grid charts are large and cumbersome in that a very large quantity of colour options need to be presented in order to encompass the range of variation required to refine (selected visually or via measuring the most closely matching build) all spot colours, whether they appear chromatic (colourful, saturated colours) or appear with less chroma (light pastel, grey and dark unsaturated colours). FIG. 2 illustrates an example of a prior art grid chart—in this case for a specific colour green.

Furthermore, this invention is necessitated because in many instances, printed work is often re-printed at a later stage in subsequent print or production runs. In many cases an acceptable match of the print deemed as the original or colour standard when re-printing, is not easily achieved, due to variations in many factors related to colour matching such as calibration deviation, substrate inconsistency, ambient and environmental factors, and mechanical variables between different printing presses. In the prior art, the first original print or colour standard, an example of which is usually filed in a work ticket, does not contain, on the same print, colour targets indicative of the calibration status of the press (which is not colour managed via CMM), an example of the printed product itself (which is colour managed via CMM), as well as the grid chart colour builds and their respective build values available for each spot colour in the job. This leads to incomplete data available to the operator or press (via integrated colourimetry) in order to achieve the best match for a print or re-print (whether on the same or a different machine) and requires multiple starts/stops of the printing press to run calibration, grid charts and colour managed prints.

SUMMARY OF THE INVENTION

According to the invention there is provided a colour standard, assembled from a graphic digital input file, in which one or a combination of CMYK, RGB, Lab or spot colour builds are contained, the colour standard comprising—
at least one colour target calibration strip which is indicative of the calibration status of a printing press, wherein the colour target calibration strip is not colour-managed, apart from ink limits, linearization and such aims;
an output image which is indicative of the digital input file, wherein the output image is colour-managed; and
a grid chart of spot colour builds, built-in process inks, with their respective process build values available for each spot colour in the digital input file;
the colour standard being so configured to capture the calibrated state of the press for a particular digital input file in order to achieve a particular colour-managed output image, so that product print runs of the output image can be repeated accurately and consistently over time.

The colour target calibration strip may depict the calibration status of the printing press at a specific point in time when the colour standard is printed. The colour target calibration strip may bypass source colour management such that it is not simulating another device. The colour target calibration strip may use, via calibration characterization, the full printing press gamut.

The output image, which also indicates what a product print would look like, may be colour-managed according to a calibration/linearization of a particular printing press and a Colour Management Module (CMM) for a particular substrate. In general, CMYK portions of the digital input file may utilize the CMM to simulate a standard, such as an ISO standard, and the spot colour portions may bypass source colour management (thus not simulating another device when printing spot colours) and use (via calibration characterization) the full press gamut (colour space) to simulate spot colour aims.

The grid chart of spot colour build options may be arranged in a grid according to the Lab/LCh colour model, depicting vertically increased and decreased Lightness and Chroma, and horizontally increased and decreased hue angles, weighted relative to the Lightness of a spot colour aim it attempts to represent. Grid chart variations of the invention are created in relation to the Lightness value of a particular colour, meaning a weighted increase or decrease in Lightness, Chroma and hue (LCh). The grid chart may be created in the LCh colour space prior to a device channel colour build taking place and each block on the grid may be built into its device colour build represented by a single block of colour subsequently. This is a departure from prior art, where grid chart colours are derived from a single device channel colour build, subsequently having additional options created using addition or subtraction of tone percentages.

The grid chart of spot colour build options may be compiled by—
determining spot colour aim values in the LCh colour space;
producing a nine-block grid chart to produce eight variations of a colour aim using the following formula:

(1) Increased Lightness, Chroma and Hue:

(1.1) $L2 = L1 + 0.05(100-L1)$
(1.2) $C2 = C1 + 0.05(100-L1)$
(1.3) $H2 = H1 + 0.05L1$
(2) Increased Lightness and Chroma:

(2.1) $L2 = L1 + 0.05(100-L1)$
(2.2) $C2 = C1 + 0.05(100-L1)$
(2.3) $H2 = H1$
(3) Increased Lightness and Chroma and decreased Hue:

(3.1) $L2 = L1 + 0.05(100-L1)$
(3.2) $C2 = C1 + 0.05(100-L1)$
(3.3) $H2 = H1 - 0.05L1$
(4) Increased Hue:

(4.1) $L2 = L1$
(4.2) $C2 = C1$
(4.3) $H2 = H1 + 0.05L1$
(5) Colour (product) Aim:

(5.1) $L2 = L1$
(5.2) $C2 = C1$
(5.3) $H2 = H1$
(6) Decreased Hue:

(6.1) $L2 = L1$
(6.2) $C2 = C1$
(6.3) $H2 = H1 - 0.05L1$
(7) Decreased Lightness and Chroma and Increased Hue:

-continued (7.1) L2 = L1 − 0.05(100-L1)
(7.2) C2 = C1 − 0.05(100-L1)
(7.3) H2 = H1 + 0.05L1
(8) Decreased Lightness and Chroma:

(8.1) L2 = L1 − 0.05(100-L1)
(8.2) C2 = C1 − 0.05(100-L1)
(8.3) H2 = H1
(9) Decreased Lightness, Chroma and Hue:

(9.1) L2 = L1 − 0.05(100-L1)
(9.2) C2 = C1 − 0.05(100-L1)
(9.3) H2 = H1 − 0.05L1 wherein L1=Original Lightness value, L2=Adjusted lightness value after applying the conversion, C1=Original Chroma, C2=Adjusted Chroma after applying the conversion, H1=Original Hue, H2=Adjusted Hue after applying the conversion, L, C & H are all variables, while 0.05 and 100 are all constants;
interpreting the colour aim and each variation from its LCh aim colours into the closest matching device build using an output profile (full gamut) of the digital printing press or proofer; and
building the grid chart using output device colour builds and describing build values for each corresponding colour build.

According to a second aspect of the invention there is provided a method of producing a grid chart of spot colour build options, the method comprising the steps of—
determining spot colour aim values in the LCh colour space;
producing a nine-block grid chart to produce eight variations of a colour aim using the following formula:

(1) Increased Lightness, Chroma and Hue:

(1.1) L2 = L1 + 0.05(100-L1)
(1.2) C2 = C1 + 0.05(100-L1)
(1.3) H2 = H1 + 0.05L1
(2) Increased Lightness and Chroma:

(2.1) L2 = L1 + 0.05(100-L1)
(2.2) C2 = C1 + 0.05(100-L1)
(2.3) H2 = H1
(3) Increased Lightness and Chroma and decreased Hue:

(3.1) L2 = L1 + 0.05(100-L1)
(3.2) C2 = C1 + 0.05(100-L1)
(3.3) H2 = H1 − 0.05L1
(4) Increased Hue:

(4.1) L2 = L1
(4.2) C2 = C1
(4.3) H2 = H1 + 0.05L1
(5) Colour (product) Aim:

(5.1) L2 = L1
(5.2) C2 = C1
(5.3) H2 = H1
(6) Decreased Hue:

(6.1) L2 = L1
(6.2) C2 = C1
(6.3) H2 = H1 − 0.05L1
(7) Decreased Lightness and Chroma and Increased Hue:

(7.1) L2 = L1 − 0.05(100-L1)
(7.2) C2 = C1 − 0.05(100-L1)
(7.3) H2 = H1 + 0.05L1
(8) Decreased Lightness and Chroma:

(8.1) L2 = L1 − 0.05(100-L1)
(8.2) C2 = C1 − 0.05(100-L1)
(8.3) H2 = H1
(9) Decreased Lightness, Chroma and Hue:

(9.1) L2 = L1 − 0.05(100-L1)
(9.2) C2 = C1 − 0.05(100-L1)
(9.3) H2 = H1 − 0.05L1 wherein L1=Original Lightness value, L2=Adjusted lightness value after applying the conversion, C1=Original Chroma, C2=Adjusted Chroma after applying the conversion, H1=Original Hue, H2=Adjusted Hue after applying the conversion, L, C & H are all variables, while 0.05 and 100 are all constants;
interpreting the colour aim and each variation from its LCh aim colours into the closest matching device build using an output profile (full gamut) of the digital printing press or proofer; and
building the grid chart using output device colour builds and describing build values for each corresponding colour build.

The applicant believes that the invention will facilitate the process of accurate proofing and selection of optimal colour builds to represent a particular colour aim.

SPECIFIC EMBODIMENT OF THE INVENTION

The patent or application file contains at least one drawing executed in color. Copies of this patent or patent application publication with color drawing(s) will be provided by the Office upon request and payment of the necessary fee.

Within wishing to be bound thereto, the invention will now further be described and illustrated with reference to the accompanying, non-limiting examples and FIGS. 1 to 7 in which—

FIG. 1 is an example of graphic digital input file that may be used for a production print run;

FIG. 2 is an example of a prior art grid chart of colour builds which would normally be required for the digital input file of FIG. 1, FIG. 2 representing only the green spot colours on which the trade mark Moringa™ is printed in FIG. 1;

FIG. 3 is an example of a colour standard according to the invention for the graphic digital input file of FIG. 1, including (i) an output image, which is indicative of the input file and default aims; (ii) a colour target calibration strip, which is indicative of the calibration status of the printing press; and (ii) a grid chart of spot colour builds, created according to the formula described in this invention, with its respective build values available for each spot colour in the digital input file;

FIG. 4 is an enlarged view of the grid chart of spot colour builds of FIG. 3, for the pantone colours 618C, 7729C and 3425C that are used in the digital input file of FIG. 1;

FIG. 5 is an enlarged view of the colour target calibration strip of FIG. 3;

FIG. 6 is an illustrative comparison between the prior art, where grid chart colours are derived from a single device channel colour build; and the invention where grid chart colours are created in the LCh colour space prior to a device channel colour build taking place and each block on the grid is built into its device colour build represented by a single block of colour; and FIG. 7 illustrates the process of compiling a grid chart of colour builds for a particular spot colour.

A digital colour standard according to the invention is generally designated by reference numeral [10], as illustrated in FIG. 3. The digital colour standard [10] is assembled from a graphic digital input file [12], such as the one which is illustrated in FIG. 1, in which a combination of CMYK and spot colour builds are contained. The digital colour standard [10] is configured to capture the calibrated state of a printing press for the particular digital input file [12] of FIG. 1 in order to achieve a particular colour-managed output image [16], so that product print runs of the output image [16] can be repeated accurately and consistently over time.

The digital colour standard [10] comprises at least one colour target calibration strip [14] which is indicative of the calibration status of the printing press, wherein the colour target calibration strip [14] is not colour-managed, apart from ink limits, linearization and such aims; a colour-managed output image [16] which is indicative of the input file; and a grid chart [18] of spot colour builds with their respective build values available for each spot colour in the digital input file [12].

The colour target calibration strip [14] depicts the calibration status of the printing press at a specific point in time when the colour standard [10] is printed. The target calibration strip [14] bypasses source colour management such that it is not simulating another device when printing spot colours. The target calibration strip [14] uses, via calibration characterization, the full printing press gamut.

The output image [16] is colour-managed according to a calibration/linearization of a particular printing press and a Colour Management Module (CMM) for a particular substrate. In general, CMYK portions of the digital input file [12] utilize the CMM to simulate a standard, such as an ISO standard, and the spot colour portions bypass source colour management (thus not simulating another device when printing spot colours) and use (via calibration characterization) the full press gamut (colour space) to simulate spot colour aims.

The grid chart [18] of spot colour build options is arranged in a grid according to the LCh colour model, depicting vertically increased and decreased Lightness and Chroma, and horizontally increased and decreased hue angles, weighted relative to the Lightness of a spot colour aim it attempts to represent. Those who are engaged in the printing industry will appreciate the Lab/LCh colour space is typically used to describe spot colours, as the Lab/LCh gamut approximates the extent of human vision and thus is a large enough colour gamut to encompass all possible spot colours as well as CMYK process and n-colour process colour gamuts.

The LCh colour space is a Lab cube colour space, where instead of Cartesian coordinates a*, b*, the cylindrical coordinates C* (chroma, relative saturation) and h° (hue angle, angle of the hue in the Lab colour wheel) are specified. The Lab lightness Lab* remains unchanged. For the purpose of expediency, the formula to determine grid chart variations according to this invention utilises LCh. The exact same result can be achieved using a formula adapted for Lab and thus this invention is not limited to a LCh formula exclusively.

Grid chart [18] variations of the invention are created in relation to the Lightness value of a particular colour, meaning a relative increase or decrease in Lightness, Chroma and hue (LCh). The grid chart [18] is created in the LCh colour space prior to a device channel colour build taking place and each block on the grid is built into its device colour build represented by a single block of colour. This is a departure from prior art, where grid chart colours (refer FIG. 2) are derived from a single device channel colour build.

According to the invention (refer FIG. 7), a nine-block grid chart [18, 22, 26] of spot colour builds (variations) of the digital input file [12] of FIG. 1 is created by first determining the spot colour aim values in the LCh colour space (refer FIG. 6), and then producing the grid chart [18] comprising eight variations of each colour aim of the digital input file [12], using the following formula:

| (1) Increased Lightness, Chroma and Hue: |
|---|
| (1.1) L2 = L1 + 0.05(100-L1) |
| (1.2) C2 = C1 + 0.05(100-L1) |
| (1.3) H2 = H1 + 0.05L1 |
| (refer 18.1; 22.1; 26.1 on FIG. 7) |
| (2) Increased Lightness and Chroma: |
| (2.1) L2 = L1 + 0.05(100-L1) |
| (2.2) C2 = C1 + 0.05(100-L1) |
| (2.3) H2 = H1 |
| (refer 18.2; 22.2; 26.2 on FIG. 7) |
| (3) Increased Lightness and Chroma and decreased Hue: |
| (3.1) L2 = L1 + 0.05(100-L1) |
| (3.2) C2 = C1 + 0.05(100-L1) |
| (3.3) H2 = H1 − 0.05L1 |
| (refer 18.3; 22.3: 26.3 on FIG. 7) |
| (4) Increased Hue: |
| (4.1) L2 = L1 |
| (4.2) C2 = C1 |
| (4.3) H2 = H1 + 0.05L1 |
| (refer 18.4; 22.4; 26.4 on FIG. 7) |
| (5) Colour (product) Aim: |
| (5.1) L2 = L1 |
| (5.2) C2 = C1 |
| (5.3) H2 = H1 |
| refer 18.5; 22.5: 26.5 on FIG. 7) |
| (6) Decreased Hue: |
| (6.1) L2 = L1 |
| (6.2) C2 = C1 |
| (6.3) H2 = H1 − 0.05L1 |
| (refer 18.6; 22.6; 26.6 on FIG. 7) |
| (7) Decreased Lightness and Chroma and Increased Hue: |
| (7.1) L2 = L1 − 0.05(100-L1) |
| (7.2) C2 = C1 − 0.05(100-L1) |
| (7.3) H2 = H1 + 0.05L1 |
| (refer 18.7; 22.7; 26.7 on FIG. 7) |
| (8) Decreased Lightness and Chroma: |
| (8.1) L2 = L1 − 0.05(100-L1) |
| (8.2) C2 = C1 − 0.05(100-L1) |
| (8.3) H2 = H1 |
| (refer 18.8; 22.8; 26.8 on FIG. 7) |
| (9) Decreased Lightness, Chroma and Hue: |
| (9.1) L2 = L1 − 0.05(100-L1) |
| (9.2) C2 = C1 − 0.05(100-L1) |
| (9.3) H2 = H1 − 0.05L1 |
| (refer 18.9; 22.9; 26.9 on FIG. 7) | wherein L1=Original Lightness value, L2=Adjusted lightness value after applying the conversion, C1=Original Chroma, C2=Adjusted Chroma after applying the conversion, H1=Original Hue, H2=Adjusted Hue after applying the conversion, L, C & H are all variables, while 0.05 and 100 are all constants.

The colour aim and each variation from its LCh aim colours is interpreted into the closest matching device build using an output profile (full gamut) of the digital printing press or proofer; and the grid chart is built using output device colour builds and describing build values for each corresponding colour build.

Referring to FIGS. 6 and 7, the grid chart [18] of the invention is created in the LCh colour space [28] prior to a device channel colour build [30] taking place and each block on the grid chart [18] is built into its device colour build [30] represented by a single block of colour subsequently. This is a departure from prior art, where grid chart colours [32] are derived from a single device channel colour build [34], with tone addition and/or subtraction subsequently creating additional colour options on the grid chart. The grid chart [18] of spot colour builds according to the invention is compiled by first determining spot colours [24] for the colour aim [20] in the LCh colour space [28]. A grid chart [18] is produced, using the formula described herein to produce eight variations of the colour aim [20]. The colour aim [20] and each variation [22] thereof is interpreted from their LCh aim colours into the closest matching device build [26] using the output profile full gamut) of the digital printing press or proofer. The grid chart [18] is then built using the output device colour builds [26] and the build values are described for each corresponding colour build.

By using this invention, a single document, requiring a single print submission can be made reflecting the calibration status of the press, the spot colour grid chart [18] with colour build options reflecting efficient arrangement according to LCh aims and the colour managed aspects of the print. This then becomes a print company's colour standard for current and future print runs. This invention extends it benefits to proofing devices (for example inkjet printers) where, once again, the superior LCh grid chart method delivers fewer, but far more relevant colour builds.

It will be appreciated that other embodiments of the invention as possible without departing from the spirit or scope of the invention as defined in the claims.

The invention claimed is:

1. A colour standard, assembled from a graphic digital input file, in which one or a combination of CMYK, RGB, Lab or spot colour builds are contained, the colour standard comprising—
   at least one colour target calibration strip which is indicative of the calibration status of a printing press, wherein the colour target calibration strip is not colour-managed, apart from ink limits and/or linearization;
   an output image which is indicative of the digital input file, wherein the output image is colour-managed; and
   a grid chart of spot colour builds, built-in process inks, with their respective process build values available for each spot colour in the digital input file;
   the colour standard being so configured to capture the calibrated state of the press for a particular digital input file in order to achieve a particular colour-managed output image, so that product print runs of the output image can be repeated accurately and consistently over time.

2. The colour standard according to claim 1 wherein the colour target calibration strip bypasses source colour management, such that it is not simulating another device, and uses the full printing press gamut via calibration characterization, such that it depicts the calibration status of the printing press at a specific point in time when the colour standard is printed.

3. The colour standard according to claim 1 wherein the output image, which indicates what a product print should look like, is colour-managed according to a calibration/linearization of a particular printing press and a corresponding Colour Management Module (CMM) for each particular substrate.

4. The colour standard according to claim 3 wherein CMYK portions of the digital input file utilize the CMM to simulate a standard, such as an ISO standard, and the spot colour portions bypass source colour management, thus not simulating another device when printing spot colours, and use, via calibration characterization, the full press gamut to simulate spot colour aims.

5. The colour standard according to claim 1 wherein the grid chart of spot colour build options are arranged in a grid according to the Lab/LCh colour model, depicting vertically increased and decreased Lightness and Chroma, and horizontally increased and decreased hue angles, weighted relative to the Lightness of a spot colour aim it attempts to represent.

6. The colour standard according to claim 5 wherein the grid chart variations are created in relation to the Lightness value of a particular colour, meaning a weighted increase or decrease in Lightness, Chroma and hue (LCh).

7. The colour standard according to claim 6 wherein the grid chart is created in the LCh colour space prior to a device channel colour build taking place and each block on the grid is built into its device colour build represented by a single block of colour subsequently.

8. The colour standard according to claim 7 wherein the grid chart of spot colour build options is compiled by—
   determining spot colour aim values in the LCh colour space;
   producing a nine-block grid chart to produce eight variations of a colour aim using the following formula:

| (2) Increased Lightness, Chroma and Hue: |
| --- |
| (1.1) $L2 = L1 + 0.05(100-L1)$ |
| (1.2) $C2 = C1 + 0.05(100-L1)$ |
| (1.3) $H2 = H1 + 0.05L1$ |
| (2) Increased Lightness and Chroma: |
| (2.1) $L2 = L1 + 0.05(100-L1)$ |
| (2.2) $C2 = C1 + 0.05(100-L1)$ |
| (2.3) $H2 = H1$ |
| (3) Increased Lightness and Chroma and decreased Hue: |
| (3.1) $L2 = L1 + 0.05(100-L1)$ |
| (3.2) $C2 = C1 + 0.05(100-L1)$ |
| (3.3) $H2 = H1 - 0.05L1$ |
| (4) Increased Hue: |
| (4.1) $L2 = L1$ |
| (4.2) $C2 = C1$ |
| (4.3) $H2 = H1 + 0.05L1$ |
| (5) Colour (product) Aim: |
| (5.1) $L2 = L1$ |
| (5.2) $C2 = C1$ |
| (5.3) $H2 = H1$ |
| (6) Decreased Hue: |
| (6.1) $L2 = L1$ |
| (6.2) $C2 = C1$ |
| (6.3) $H2 = H1 - 0.05L1$ |
| (7) Decreased Lightness and Chroma and Increased Hue: |
| (7.1) $L2 = L1 - 0.05(100-L1)$ |
| (7.2) $C2 = C1 - 0.05(100-L1)$ |
| (7.3) $H2 = H1 + 0.05L1$ |
| (8) Decreased Lightness and Chroma: |
| (8.1) $L2 = L1 - 0.05(100-L1)$ |
| (8.2) $C2 = C1 - 0.05(100-L1)$ |
| (8.3) $H2 = H1$ |
| (9) Decreased Lightness, Chroma and Hue: |
| (9.1) $L2 = L1 - 0.05(100-L1)$ |

(9.2) C2 = C1 − 0.05(100-L1)
(9.3) H2 = H1 − 0.05L1 wherein L1=Original Lightness value, L2=Adjusted lightness value after applying the conversion, C1=Original Chroma, C2=Adjusted Chroma after applying the conversion, H1=Original Hue, H2=Adjusted Hue after applying the conversion, L, C & H are all variables, while 0.05 and 100 are all constants;
interpreting the colour aim and each variation from its LCh aim colours into the closest matching device build using an output profile (full gamut) of the digital printing press or proofer; and
building the grid chart using output device colour builds and describing build values for each corresponding colour build.

9. A method of producing a grid chart of spot colour build options, the method comprising the steps of—
determining spot colour aim values in the LCh colour space;
producing a nine-block grid chart to produce eight variations of a colour aim using the following formula:

(2) Increased Lightness, Chroma and Hue:

(1.1) L2 = L1 + 0.05(100-L1)
(1.2) C2 = C1 + 0.05(100-L1)
(1.3) H2 = H1 + 0.05L1
(2) Increased Lightness and Chroma:

(2.1) L2 = L1 + 0.05(100-L1)
(2.2) C2 = C1 + 0.05(100-L1)
(2.3) H2 = H1
(3) Increased Lightness and Chroma and decreased Hue:

(3.1) L2 = L1 + 0.05(100-L1)
(3.2) C2 = C1 + 0.05(100-L1)
(3.3) H2 = H1 − 0.05L1
(4) Increased Hue:

(4.1) L2 = L1
(4.2) C2 = C1
(4.3) H2 = H1 + 0.05L1
(5) Colour (product) Aim:

(5.1) L2 = L1
(5.2) C2 = C1
(5.3) H2 = H1
(6) Decreased Hue:

(6.1) L2 = L1
(6.2) C2 = C1
(6.3) H2 = H1 − 0.05L1
(7) Decreased Lightness and Chroma and Increased Hue:

(7.1) L2 = L1 − 0.05(100-L1)
(7.2) C2 = C1 − 0.05(100-L1)
(7.3) H2 = H1 + 0.05L1
(8) Decreased Lightness and Chroma:

(8.1) L2 = L1 − 0.05(100-L1)
(8.2) C2 = C1 − 0.05(100-L1)
(8.3) H2 = H1
(9) Decreased Lightness, Chroma and Hue:

(9.1) L2 = L1 − 0.05(100-L1)
(9.2) C2 = C1 − 0.05(100-L1)
(9.3) H2 = H1 − 0.05L1 wherein L1=Original Lightness value, L2=Adjusted lightness value after applying the conversion, C1=Original Chroma, C2=Adjusted Chroma after applying the conversion, H1=Original Hue, H2=Adjusted Hue after applying the conversion, L, C & H are all variables, while 0.05 and 100 are all constants;
interpreting the colour aim and each variation from its LCh aim colours into the closest matching device build using an output profile (full gamut) of the digital printing press or proofer; and
building the grid chart using output device colour builds and describing build values for each corresponding colour build.

\* \* \* \* \*